(12) United States Patent
Lee et al.

(10) Patent No.: US 8,743,063 B2
(45) Date of Patent: Jun. 3, 2014

(54) LIQUID CRYSTAL DISPLAY WITH INTEGRATED TOUCH SCREEN PANEL

(75) Inventors: Seung-Kyu Lee, Yongin (KR); Jin-Woo Park, Yongin (KR); Dong-Hoon Lee, Yongin (KR); Chul-Ho Kim, Yongin (KR); Chi-Woo Kim, Yongin (KR); Joo-Hyung Lee, Yongin (KR); Soo-Guy Rho, Yongin (KR); Sang-Jin Pak, Yongin (KR)

(73) Assignee: Samsung Display Co., Ltd., Gyeonngi-Do (KR)

( * ) Notice: Subject to any disclaimer, the term of this patent is extended or adjusted under 35 U.S.C. 154(b) by 396 days.

(21) Appl. No.: 13/115,869

(22) Filed: May 25, 2011

(65) Prior Publication Data

US 2012/0105381 A1    May 3, 2012

(30) Foreign Application Priority Data

Oct. 29, 2010    (KR) ........................ 10-2010-0106738

(51) Int. Cl.
*G06F 3/041*    (2006.01)
(52) U.S. Cl.
USPC ............................................ 345/173; 345/87

(58) Field of Classification Search
None
See application file for complete search history.

(56) References Cited

U.S. PATENT DOCUMENTS

| | | | |
|---|---|---|---|
| 2004/0189587 A1* | 9/2004 | Jung et al. ..................... | 345/102 |
| 2007/0268243 A1* | 11/2007 | Choo et al. .................... | 345/104 |
| 2008/0062147 A1* | 3/2008 | Hotelling et al. ............. | 345/174 |
| 2010/0045620 A1* | 2/2010 | Long et al. .................... | 345/173 |

FOREIGN PATENT DOCUMENTS

KR    10-2009-0019902 A    2/2009

* cited by examiner

*Primary Examiner* — Adam R Giesy
(74) *Attorney, Agent, or Firm* — Knobbe Martens Olson & Bear, LLP

(57) ABSTRACT

A liquid crystal display with an integrated touch screen panel is disclosed. According to some aspects, conductive patterns or conducting patterns provided to the LCD are used as driving electrodes of the touch screen panel. A driving electrode of the touch screen panel may be formed on one surface of a polarizing plate or window attached to the LCD so as to be positioned close to a contact point, thereby improving touch sensitivity.

10 Claims, 7 Drawing Sheets

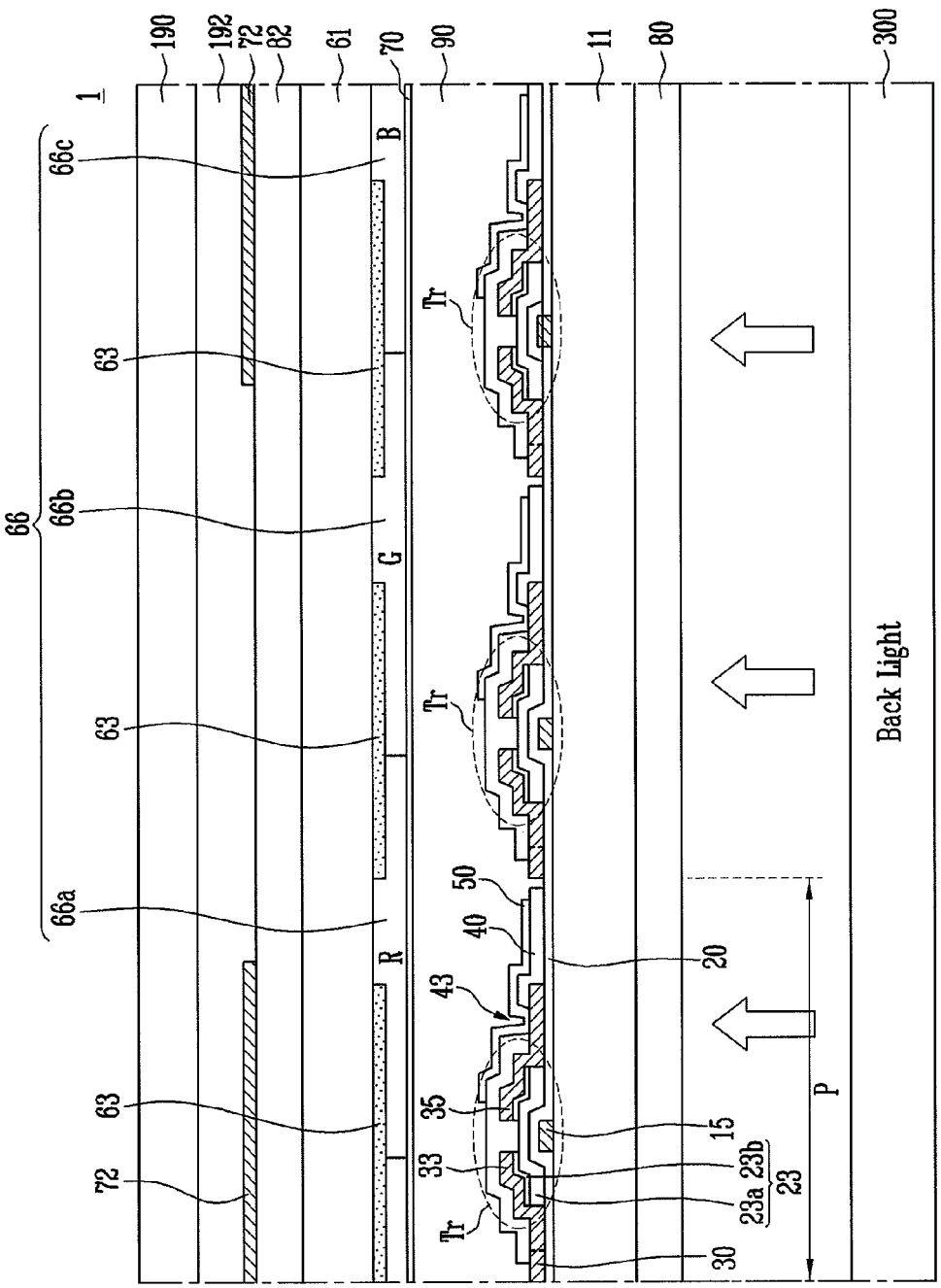

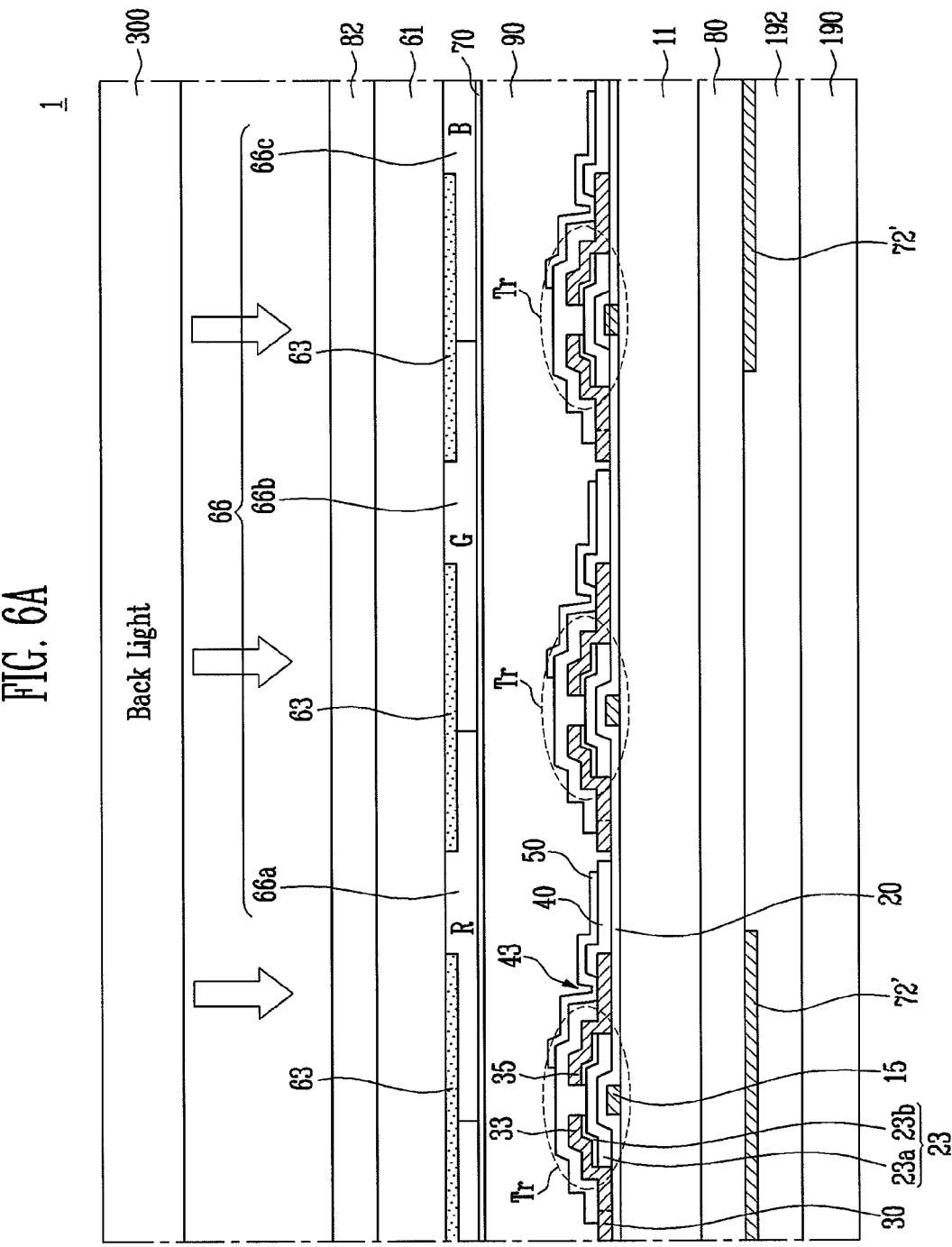

LIQUID CRYSTAL DISPLAY WITH INTEGRATED TOUCH SCREEN PANEL

CROSS-REFERENCE TO RELATED APPLICATIONS

This application claims priority to and the benefit of Korean Patent Application No. 10-2010-0106738, filed on Oct. 29, 2010, in the Korean Intellectual Property Office, the entire content of which is incorporated herein by reference.

BACKGROUND

1. Field

The technological field relates to a liquid crystal display (LCD), and more particularly, to an LCD provided with a mutual capacitive touch screen panel.

2. Description of the Related Technology

A touch screen panel is an input device that allows a user's instruction to be input by selecting an instruction content displayed on a screen of a display device or the like with a user's hand or object.

To this end, the touch screen panel is formed on a front face of the display device to convert a contact position into an electrical signal. Here, the user's hand or object is directly in contact with the touch screen panel at the contact position. Accordingly, the instruction content selected at the contact position is input as an input signal to the display device.

Since such a touch screen panel can be substituted for a separate input device connected to a display device, such as a keyboard or mouse, its use in commercial products has been increasing.

Touch screen panel technologies can be classified as resistive overlay touch screen panel, photosensitive touch screen panel, capacitive touch screen panel, and the like. Among these technologies, the capacitive touch screen panel converts a contact position into an electrical signal by sensing a change in capacitance formed between a conductive sensing pattern and an adjacent sensing pattern, ground electrode or the like when a user's hand or object is in contact with the touch screen panel.

Such a touch screen panel generally is attached to an outer surface of a flat display device such as a liquid crystal display device or organic light emitting display device so as to be implemented as a product.

However, in a case where a touch screen panel is attached to an outer face of a flat panel display, it is necessary to provide an adhesive layer between the touch screen panel and the flat panel display, and it is required to separately perform a forming process of the touch screen panel. Therefore, processing time and cost are increased.

Further, in the case of the conventional structure, the touch screen panel is attached to an outer surface of the flat panel display, and therefore, the entire thickness of the flat panel display is increased.

SUMMARY OF CERTAIN INVENTIVE ASPECTS

Embodiments provide a liquid crystal display (LCD) with an integrated touch screen panel, in which conductive patterns or conducting patterns provided to the LCD are used as driving electrodes of the touch screen panel, and the driving electrode of the touch screen panel is formed on one surface of a polarizing plate or window attached to the LCD so as to be positioned close to a contact point, thereby improving touch sensitivity.

One aspect includes, an LCD with an integrated touch screen panel, the LCD including: a first substrate having a plurality of pixels formed thereon, wherein each of the plurality of pixels comprises a thin film transistor and a pixel electrode; a second substrate positioned to face the first substrate, the second substrate having a plurality of common electrode patterns formed thereon, wherein the plurality of common electrode patterns are arranged in a first direction to respectively correspond to the pixel electrodes. The LCD may further include first and second polarizing plates respectively attached to outer surfaces of the first and second substrates, and a window attached to an outer surface of the second polarizing plate. Sensing electrodes formed on one surface of the second polarizing plate or window and implemented as a plurality of patterns arranged in a second direction intersected with the first direction may be provided. The LCD may further include a liquid crystal layer formed between the first and second substrate.

According to another aspect, an LCD with an integrated touch screen panel. The LCD may include a first substrate having a plurality of pixels formed thereon, wherein the plurality of pixels are positioned between gate and storage lines arranged in a first direction and data lines arranged in a second direction, respectively, and each of the plurality of pixels comprises a thin film transistor and a pixel electrode. A second substrate positioned to face the first substrate may be provided, the second substrate having color filter patterns arranged corresponding to the respective pixels and a common electrode formed on the color filter patterns. The LCD may further include first and second polarizing plates respectively attached to outer surfaces of the first and second substrates, and a window attached to an outer surface of the first polarizing plate. Sensing electrodes formed on one surface of the first polarizing plate or window and configured as a plurality of patterns arranged in the second direction. A liquid crystal layer may be formed between the first and second substrates. The gate or storage lines may be used as driving electrodes respectively corresponding to the sensing electrodes The LCD may further include a backlight positioned on a top surface of the second substrate to provide light.

BRIEF DESCRIPTION OF THE DRAWINGS

The accompanying drawings, together with the specification, illustrate exemplary embodiments of the present invention, and, together with the description, serve to explain the principles of the present invention.

FIGS. 1A and 1B are sectional views showing one area of a liquid crystal display (LCD) with an integrated touch screen panel according to some embodiments.

FIGS. 6A and 6B are sectional views showing one area of an LCD with an integrated touch screen panel according to some embodiments.

DETAILED DESCRIPTION OF CERTAIN INVENTIVE EMBODIMENTS

Figure 1B:
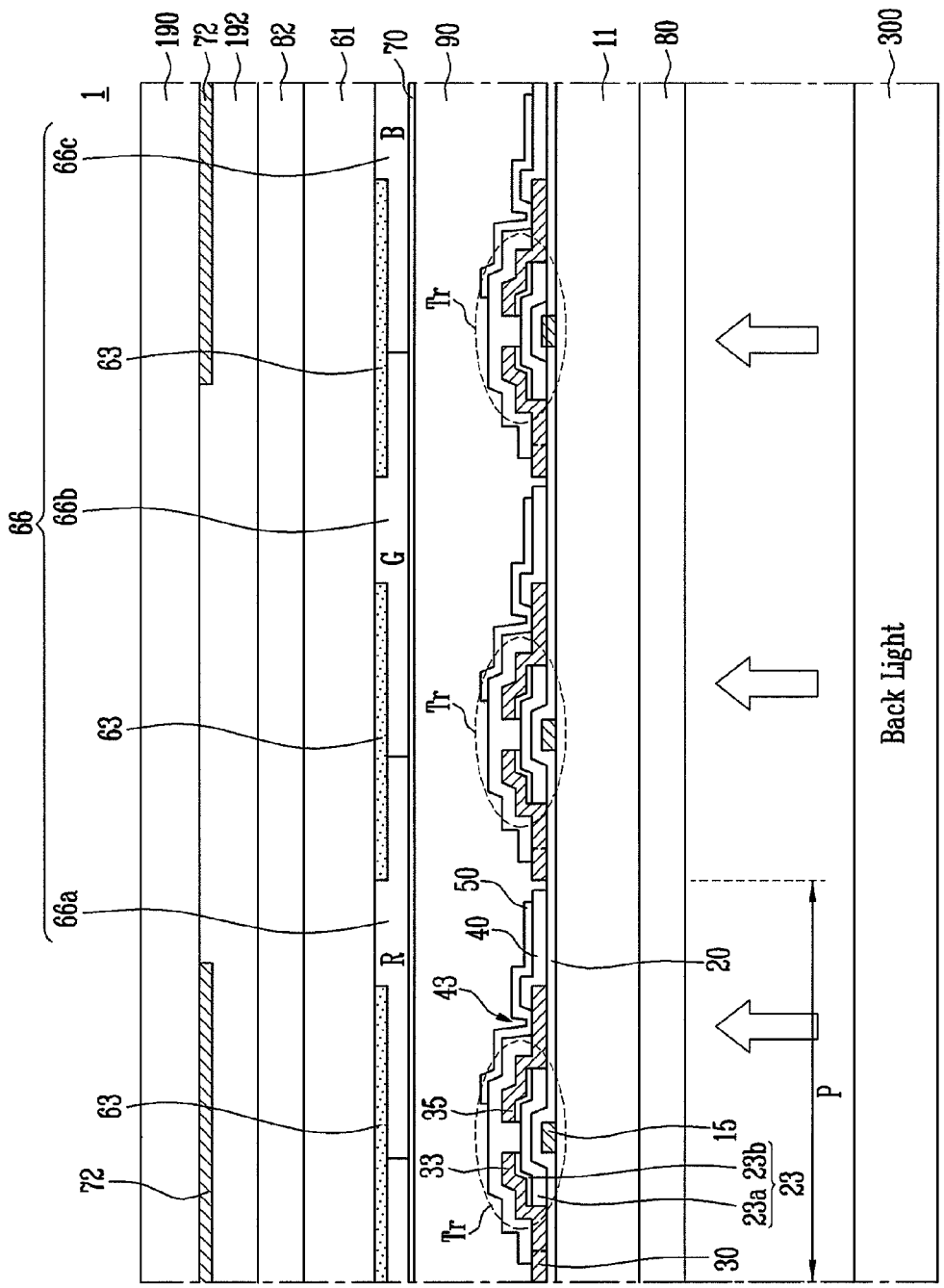

In the following detailed description, only certain exemplary embodiments have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the other element or be indirectly on the other element with one or more intervening elements interposed therebetween. Also, when an element is referred to as being "connected to" another element, it can be directly connected to the other element or be indirectly connected to the other element with one or more intervening elements interposed therebetween. Hereinafter, like reference numerals refer to like elements.

Hereinafter exemplary embodiments will be described in detail with reference to the accompanying drawings.

Figure 2:
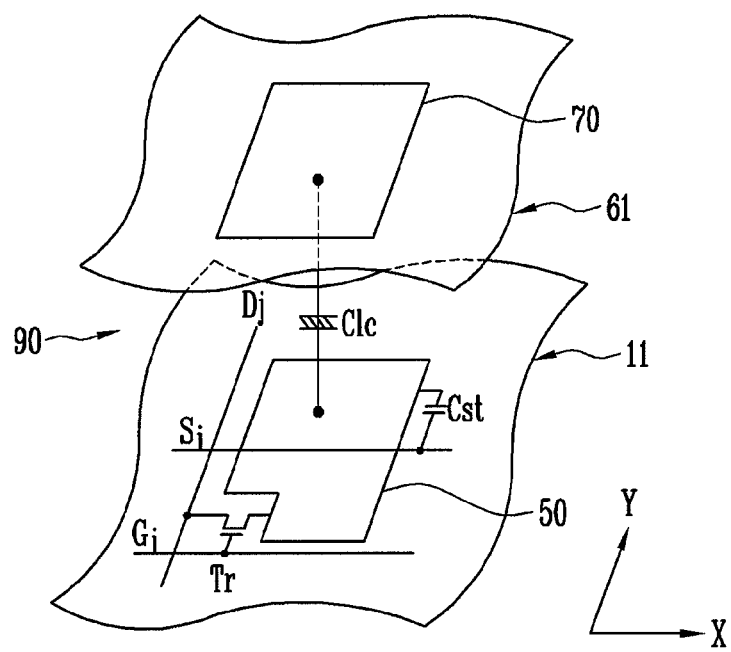
FIG. 2 is an equivalent circuit diagram of a pixel shown in FIG. 1.

FIGS. 1A and 1B are sectional views showing one area of a liquid crystal display (LCD) with an integrated touch screen panel according to an embodiment of the present invention. FIG. 2 is an equivalent circuit diagram of a pixel shown in FIG. 1.

An LCD is a display that displays an image using the optical anisotropy and polarizing property of liquid crystals. Liquid crystals with a thin and long molecular structure have an optical anisotropy in which the molecular arrangement of the liquid crystals is directionally oriented and a polarizing property in which the molecular arrangement direction of the liquid crystals is changed with an electric field according to their sizes.

Accordingly, the LCD includes a liquid crystal panel as a component. The liquid crystal panel may be configured by joining a first substrate (array substrate) and a second substrate (color filter substrate) respectively having pixel electrodes and a common electrode, formed on surfaces opposite to each other with a liquid crystal layer interposed therebetween. The LCD is a non-luminescent device that artificially controls the arrangement direction of liquid crystal molecules through a change in electric field between the pixel and common electrodes and displays various images using the transmittance of light changed accordingly.

FIGS. 1 and 2 illustrate an LCD according to some embodiments. The LCD 1 has a configuration in which a first substrate 11 as an array substrate and a second substrate 61 as a color filter substrate are joined to face each other with a liquid crystal layer 90 interposed therebetween. Among these substrates, the lower first substrate 11 includes a plurality of gate lines (not shown) and a plurality of data lines 30, arranged to be intersected with each other on the top surface thereof. Thin film transistors Tr are provided at intersection portions of the gate and data lines to be connected to pixel electrodes 50 formed in pixels P one by one, respectively.

In some embodiments, storage lines (not shown) are alternately arranged between the respective gate lines (not shown) so as to transfer a sustained signal to each of the pixels P.

The gate and storage lines may be arranged in a first direction (e.g., an X-axis direction), and the data lines 30 may be arranged in a second direction (e.g., a Y-axis direction) intersected with the first direction.

Referring to FIG. 2, a pixel P connected to an i-th gate line Gi and a j-th data line Dj includes, for example, a thin film transistor Tr connected to the gate and data lines Gi and Dj, a liquid crystal capacitor Clc connected to the thin film transistor Tr, and a storage capacitor Cst connected to the thin film transistor Tr through an i-th storage line Si.

As shown in FIG. 1, the thin film transistor Tr includes a gate electrode 15 connected to the gate line (not shown), source/drain electrodes 33 and 35, and a semiconductor layer 23 formed between the gate electrode 15 and the source/drain electrodes 33 and 35. Here, the semiconductor layer 23 includes an active layer and an ohmic contact layer 23b.

A gate insulating layer 20 is formed on the gate electrode 15, and a protection layer 40 is formed on the source/drain electrodes 33 and 35. A contact hole 43 is formed in the protection layer 40 so that the drain electrode 35 is exposed therethrough.

The pixel electrode 50 is formed on a top of the protection layer 40 to be connected to the drain electrode 35 through the contact hole 43.

The liquid crystal capacitor Clc uses the pixel electrode 50 and a common electrode 70 on the second substrate 61 as two terminals, and the liquid crystal layer 90 between the two electrodes 50 and 70 serves as a dielectric substance.

The storage capacitor Cst is formed with first and second electrodes (not shown) and an insulating layer (e.g., the gate electrode layer 20) provided therebetween. The first or second electrode may be implemented as the storage line Si or electrically connected to the storage line Si.

A lattice-shaped black matrix 63, red, green blue color filter patterns 66a, 66b and 66c and the transparent electrode 70 may be formed on the rear surface of the upper second substrate 61 opposite to the first substrate 11. The lattice-shaped black matrix 63 surrounds each of the pixels P so as to cover a non-display area including the gate lines, the storage lines, the data lines, the thin film transistors, and the like. The red, green and blue color filter patterns 66a, 66b and 66c are sequentially and repeatedly arranged to correspond to the respective pixels P in the interior of the black matrix 63. The common electrode 70 is formed of a transparent conductive material below the color filter pattern 66.

Here, an overcoat layer (not shown) may be further formed between the color filter pattern 66 and the common electrode 70.

As shown in FIG. 1, first and second polarizing plates 80 and 82 are attached to outer surfaces of the first and second substrates 11 and 61, respectively. A window 190 as a transparent substrate is attached on the polarizing plate in a direction in which an image is displayed.

The embodiment illustrated in FIGS. 1 and 2 has a structure in which a back light 300 is positioned below the first substrate 11, and therefore, an image is displayed in the direction of the second substrate 61. Accordingly, the window 190 is attached on the second polarizing plate 82 by using an adhesive layer 192.

The image display operation of the LCD 1 configured as described above will be briefly described as follows.

First, if a gate signal is applied to the gate electrode 15 of the thin film transistor Tr provided to each of the pixels P, the active layer 23a is activated. Accordingly, the drain electrode 35 receives a data signal applied from the data line 30 connected to the source electrode 33 through the source electrode 33 spaced apart from the drain electrode 35 at a predetermined interval via the lower active layer 23a.

The drain electrode 35 is electrically connected to the pixel electrode 50 through the contact hole 43. Therefore, the voltage of the data signal is applied to the pixel electrode 50, and the applied voltage is stored in the storage capacitor Cst.

Accordingly, the arrangement of liquid crystal molecules between the pixel electrode 50 and the common electrode 70 may be controlled according to a voltage corresponding to the difference between voltages respectively applied to the pixel electrode 50 and the common electrode 70, thereby displaying a predetermined image.

In the conventional LCD, the common electrode 70 is integrally formed on the entire lower surface of the second substrate 61 to receive the same voltage.

On the other hand, in the LCD according to this embodiment, the common electrode 70 may be formed as a plurality of patterns separated from one another to be used as electrodes of a mutual capacitive touch screen panel.

Figure 3:
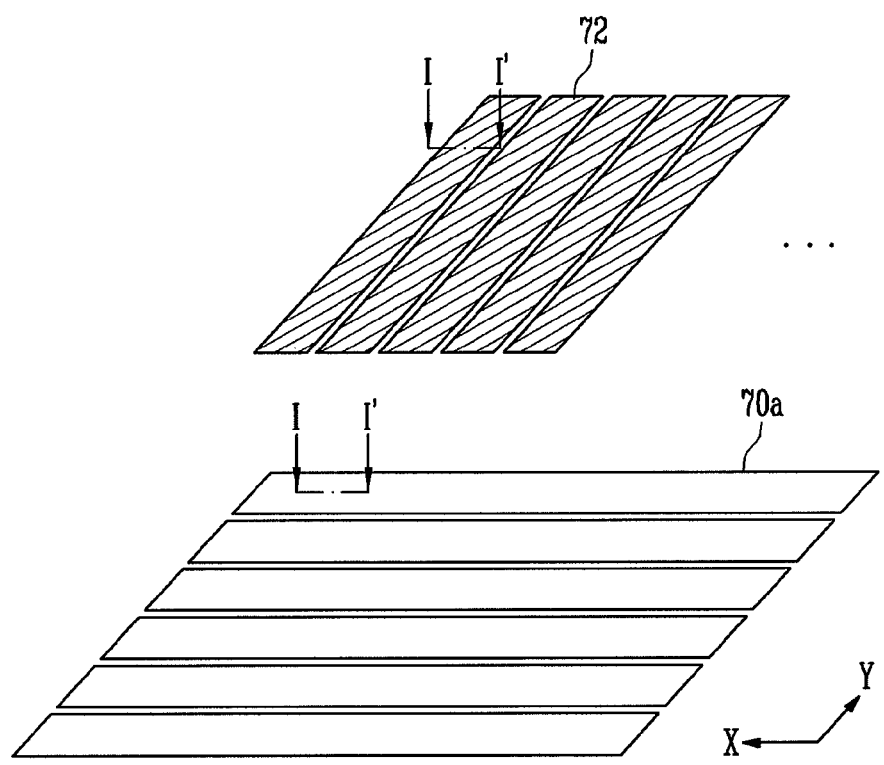
FIG. 3 is a perspective view showing the structure of common electrode patterns (driving electrodes) and sensing electrodes, shown in FIG. 1.

For example, the common electrode 70 may be implemented as a plurality of patterns 70a spaced apart at a predetermined interval in the first direction (e.g., the X-axis direction) to be used as driving electrodes of the touch screen panel (see FIG. 3). Sensing electrodes 72 of the touch screen panel may be formed on one surface of the second polarizing plate 82 or window 190.

That is, the embodiment illustrated in FIG. 1A shows that the sensing electrodes 72 may be formed on the top surface of the second polarizing plate 82, and the embodiment illustrated in FIG. 1B shows that the sensing electrodes 72 may be formed on the bottom surface of the window 190.

The sensing electrodes 72 may be implemented as a plurality of patterns arranged to be spaced apart at a predetermined interval in the second direction (e.g., the Y-axis direction) intersected with the first direction.

Here, the sensing electrodes 72 are formed of a transparent conductive material (e.g., indium tin oxide (ITO)), and a film formed by patterning the transparent conductive material may be attached to the second polarizing plate 82 or window 190, thereby implementing the sensing electrodes 72.

According to some embodiments, the interval between electrodes of the capacitive touch screen panel, i.e., the interval between driving and sensing electrodes is configured to be as large as possible such that the electrodes are spaced as far as possible from one another. The sensing electrode may be positioned close to a touch area, so that the change in capacitance between the electrodes is increased, thereby considerably improving touch sensitivity.

Hereinafter, the structure and operation of electrodes in the mutual capacitive touch screen panel according to some embodiments will be described in detail with reference to FIGS. 3 to 5.

FIG. 3 is a perspective view showing the structure of common electrode patterns (driving electrodes) and sensing electrodes, shown in FIG. 1.

Referring to FIG. 3, the common electrode is implemented as a plurality of patterns 70a arranged to be spaced apart at a predetermined interval in the first direction (e.g., the X-axis direction) so that the plurality of patterns 70a are used as driving electrode of the touch screen panel. As described above, the sensing electrodes 72 corresponding to the driving electrodes 70a may be implemented by forming the plurality of patterns arranged to be spaced apart at a predetermined interval in the second direction (e.g., the Y-axis direction) intersected with the first direction on the one surface of the second polarizing plate (82 of FIG. 1) or window (190 of FIG. 1).

The second substrate 61, the polarizing plate 82 and the like, provided between the driving and sensing electrodes 70a and 72 serve as a dielectric layer 110.

Mutual capacitances ($C_M$) between driving and sensing electrodes 70a and 72 are formed at intersection points of the driving electrodes 70a and the sensing electrodes 72, respectively. The intersection points, at which the mutual capacitances are formed, serve as sensing cells for implementing touch recognition, respectively.

In a case where a driving signal is applied to the driving electrode 70a connected to each of the sensing cells, the mutual capacitance generated in each of the sensing cells generates a sensing signal subjected to coupling of the sensing electrode 72 connected to each of the sensing cells.

The driving signal is sequentially applied to the driving electrodes 70a during one frame period. Therefore, if the driving signal is applied to any one of the driving electrodes, the other driving electrodes maintain a ground state.

Thus, mutual capacitances are respectively formed at a plurality of intersection points, i.e., sensing cells by a plurality of sensing lines intersected with the driving line to which the driving signal is applied. In a case where a finger or the like comes in contact with each of the sensing cells, a change in capacitance is generated in the corresponding sensing cell, thereby sensing the change in capacitance.

Through the configuration described above, an LCD in which a mutual capacitive touch screen panel may be implemented.

According to some aspects, the same voltage is applied to the first electrode patterns 70a during a first frame period in which the LCD performs an operation for displaying an image, and a driving signal is sequentially applied to the first electrode patterns 70a during a second frame period in which the LCD performs touch recognition.

According to some aspects, the LCD may be implemented so that the first and second frame periods are not overlapped with each other. For example, the first and second frame periods may be alternately repeated.

Figure 4A:
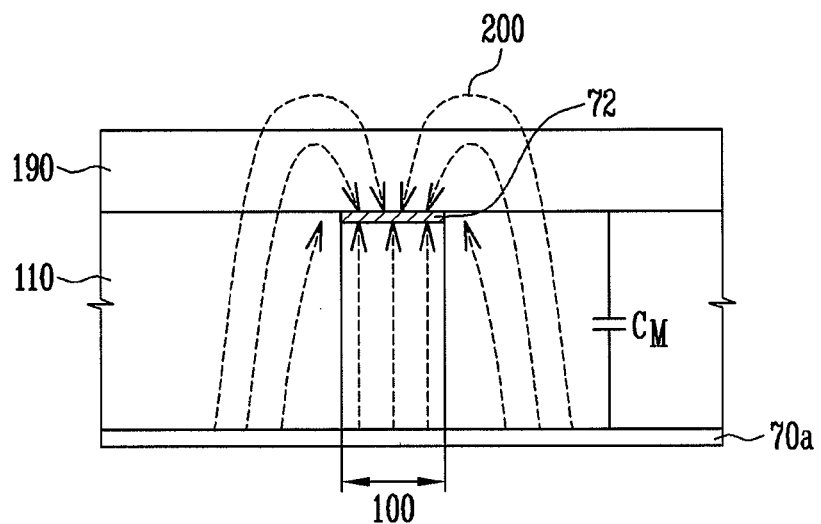
FIG. 4A is a sectional view of a sensing cell in the condition of a normal state (no touch).
Figure 4B:
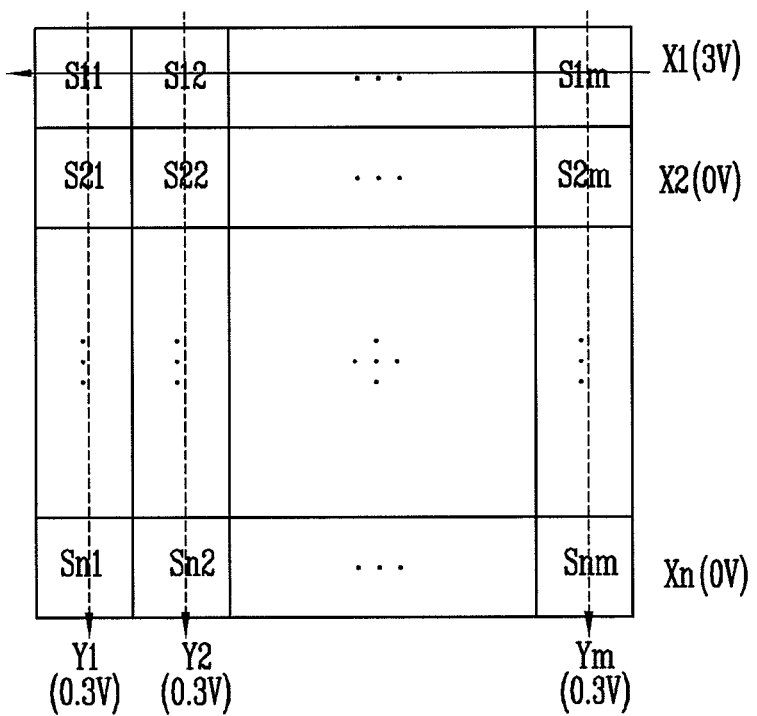
FIG. 4B is a view schematically showing a sensed result based on a driving signal applied to each sensing cell in FIG. 4A.

FIG. 4A is a sectional view of a sensing cell in the condition of a normal state (no touch). FIG. 4B is a view schematically showing a sensed result based on a driving signal applied to each sensing cell in FIG. 4A.

FIG. 4A is a sectional view showing a region (I-I') of the perspective view shown in FIG. 3, and the embodiment illustrated in FIG. 1B, i.e., the structure in which the sensing electrodes are formed on the bottom surface of the window will be described as an example.

Referring to FIG. 4A, there are shown electric field lines 200 for mutual capacitances between a driving electrode 70a and a sensing electrode 80a, separated from each other by the dielectric layer 110 (e.g., the second substrate 61) and the second polarizing plate 82.

Here, the driving electrode 70a is one of the common electrode patterns arranged to be separated from one another as described above.

According to some embodiments, the point at which the driving and sensing electrodes 70a and 72 are intersected with each other is configured to be a sensing cell 100. As shown in FIG. 4A, a mutual capacitance $C_M$ is formed between the driving and sensing electrodes 70a and 72, corresponding to the sensing cell 100.

However, the mutual capacitance $C_M$ generated in each of the sensing cells 100 is generated in a case where a driving signal is applied to the driving electrode 70a connected to each of the sensing cells 100.

That is, referring to FIG. 4B, a driving signal (e.g., a voltage of 3V) is sequentially applied to each of the driving electrodes X1, X2, . . . and Xn. In a case where the driving signal is applied to any one of the driving electrodes X1, X2, . . . and Xn, the other driving electrodes maintain a ground state. FIG. 4B illustrates an example where the driving signal is applied to the first driving electrode X1.

As illustrated in FIGS. 4A and 4B, mutual capacitances are respectively formed at a plurality of intersection points by a plurality of sensing electrodes intersected with the first driving electrode X1 to which the driving signal is applied, i.e., sensing cells S11, S12, . . . and S1m. Accordingly, a voltage (e.g., 0.3V) corresponding to the mutual capacitance is sensed from sensing electrodes Y1, Y2, . . . , Ym connected to each of the sensing cells to which the driving signal is applied.

Figure 5A:
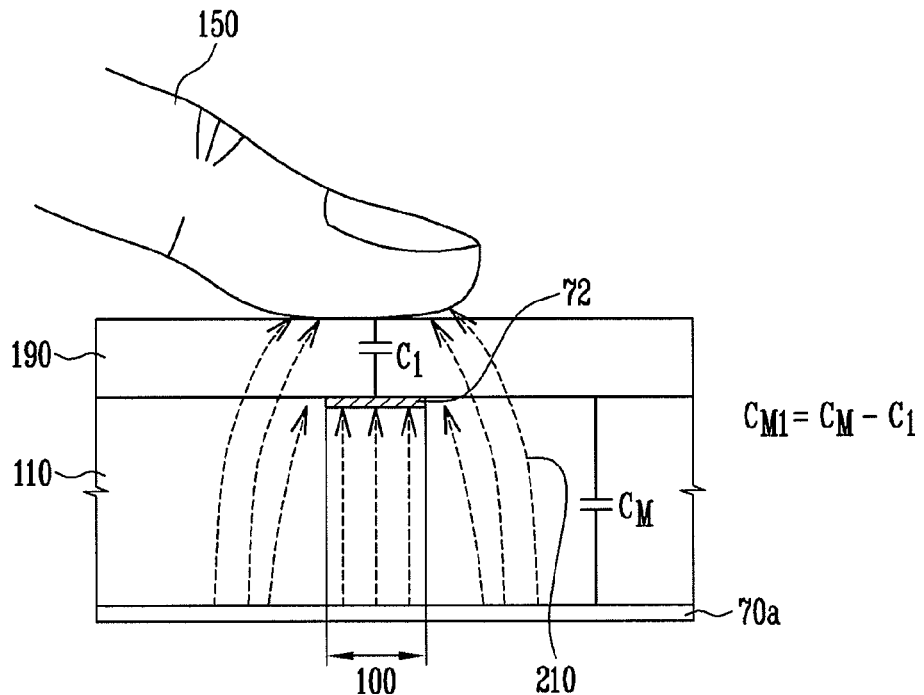
FIG. 5A is a sectional view of a sensing cell in the condition of a contact by a finger.
Figure 5B:
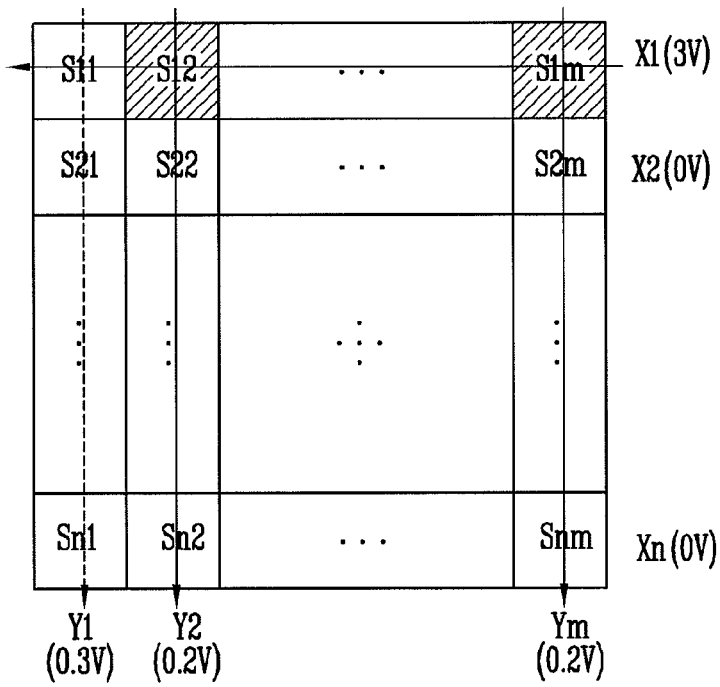
FIG. 5B is a view schematically showing a sensed result based on a driving signal applied to each sensing cell in FIG. 5A.

FIG. 5A is a sectional view of a sensing cell in the condition of a contact by a finger. FIG. 5B is a view schematically showing a sensed result based on a driving signal applied to each sensing cell in FIG. 5A.

Referring to FIG. 5A, if a finger 150 contacts at least one sensing cell 100, it is a low impedance object and has an AC capacitance $C_1$ from the sensing electrode 80a to a human body. The human body has a self capacitance of about 200 pF with respect to a ground, and the self capacitance is much greater than that of capacitance $C_1$.

In a case where an electric field line 210 between the driving and sensing electrodes 70a and 72 are shielded due to the contact of the finger 150, it is branched to the ground through a capacitance path that exists in the finger 150 and the human body, and as a result, the mutual capacitance $C_M$ in the normal state shown in FIG. 5A is decreased by the capacitance $C_1$, such that $C_{M1}=C_M-C_1$.

Also, the change in mutual capacitance in each of the sensing cells 100 changes the voltage provided to the sensing electrode 72 connected to the sensing cell 100.

That is, as shown in FIG. 5B, a driving signal (e.g., a voltage of 3V) is sequentially applied to each of the driving electrodes X1, X2, . . . and Xn, so that mutual capacitances $C_M$ are respectively formed in the plurality of sensing cells S11, S12, . . . and S1m by the plurality of sensing lines intersected with the first driving electrode X1 to which the driving signal is applied. In a case where one or more sensing cells (e.g., S12 and S1m) are contacted by the finger 150, the mutual capacitance ($C_{M1}$) is decreased, and therefore, a voltage (e.g., 0.1V) corresponding to the decreased mutual capacitance is sensed from sensing electrodes Y2 and Ym respectively connected to the contacted sensing cells S12 and S1m.

However, since the existing mutual capacitance $C_M$ is maintained in the other sensing cells which are connected to the first driving electrode X1 but are not contacted by the finger 150, the existing voltage (e.g., 0.3V) is sensed from sensing electrodes respectively connected to the other sensing cells.

That is, a precise touch position can be sensed through the difference of voltages applied to the sensing electrodes.

According to some embodiments, as shown in FIG. 5A, the sensing electrode may be formed at the closest position from the contact point, and therefore, the magnitude of the AC capacitance $C_1$ from the sensing electrode 72 to the human body may be large.

Here, the magnitude of capacitance $C_1$ being large means that the variation in capacitance when a touch occurs, i.e., the decrement ($C_{M1}=C_M-C_1$) of the mutual capacitance ($C_M$) in the normal state is increased. Accordingly, the touch sensitivity can be improved.

Figure 6B:
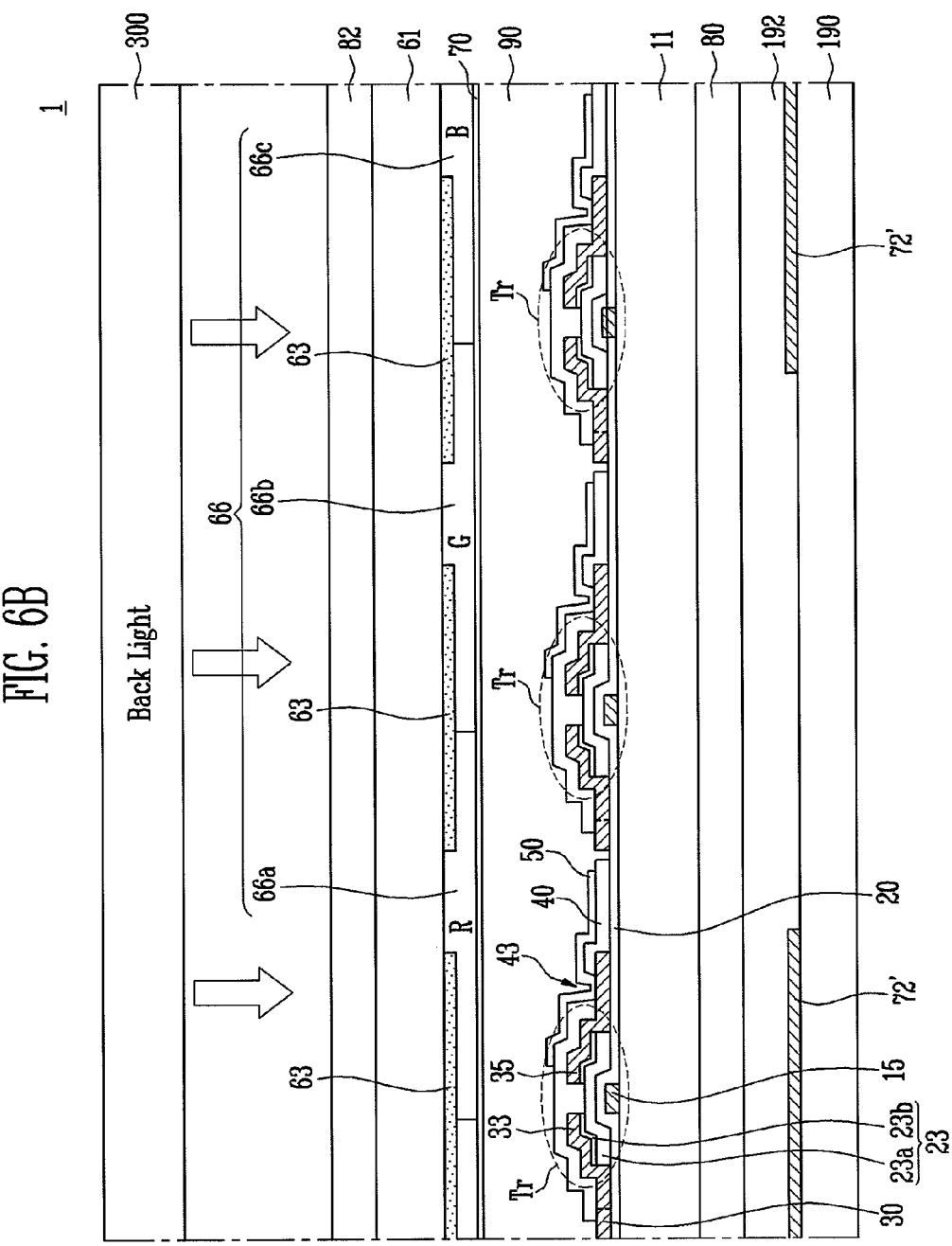

FIGS. 6A and 6B are sectional views showing one area of an LCD with an integrated touch screen panel according to some embodiments.

The embodiment illustrated in FIGS. 6A and 6B is different from the embodiment illustrated in FIGS. 1A and 1B in that the back light 300 is not positioned below the first substrate 11, but instead is positioned above the second substrate 61. Accordingly, an image is not displayed in the direction of the second substrate 61, but rather, an image is displayed in the direction of the first substrate 11.

That is, the back light 300 may be positioned above the second substrate 61 so that an image is displayed in the direction of the first substrate 11. Accordingly, the window 190 is attached to the outer surface of the first polarizing plate 80 by using the adhesive layer 192.

In this embodiment, conducting lines formed on the first substrate 11 are used as the driving electrodes of the touch screen panel.

According to some embodiments, the conducting lines may be a plurality of gate lines (not shown, Gi of FIG. 2) or a plurality of storage lines (not shown, Si of FIG. 2), arranged in a first direction.

For example, the storage lines (not shown) may be used as the driving electrodes of the touch screen panel, and sensing electrodes 72' of the touch screen panel may be formed on one surface of the first polarizing plate 80 or window 190 positioned on the bottom of the first substrate 11.

That is, the embodiment illustrated in FIG. 6A shows that the sensing electrodes 72' may be formed on one surface of the first polarizing plate 80, and the embodiment illustrated in FIG. 6B shows that the sensing electrodes 72' may be formed on the inner surface of the window 190.

According to some aspects, the sensing electrodes 72' may be implemented as a plurality of patterns arranged to be spaced apart at a predetermined interval in the second direction (e.g., the Y-axis direction) intersected with the first direction (e.g., the X-axis direction).

Here, the sensing electrodes 72' are formed of a transparent conductive material (e.g., ITO), and a film formed by patterning the transparent conductive material is attached to the first polarizing plate 80 or window 190, thereby implementing the sensing electrodes 72'.

According to some embodiments, the interval between electrodes of the capacitive touch screen panel, i.e., the interval between driving and sensing electrodes is set to be as far as possible, and the sensing electrode is positioned close to a touch area, so that the change in capacitance between the electrodes is increased. This configuration considerably improves touch sensitivity. The electrode structure and operation of the mutual capacitive touch screen panel according to this embodiment may be substantially identical to those described with reference to FIGS. 3 to 5, and therefore, their descriptions will be omitted In this case, a scan or sustain signal is applied to each of the gate or storage lines during a first frame period in which the LED displays a predetermined image, and a driving signal is sequentially applied to the gate or storage lines during a second frame period in which the LCD performs touch recognition.

According to some aspects, the first and second frame periods are not overlapped with each other. For example, the first and second frame periods may be alternately repeated.

As described above, an LCD may be provided according to some aspects. The LCD may further include a back light positioned on a bottom surface of the first substrate to provide light. The sensing electrodes described above may be formed by attaching a film in which a transparent conductive material is patterned to the second polarizing plate or window.

In driving the LCD, the same voltage may be applied to the common electrode patterns during a first frame period in which the LCD performs an operation of displaying a predetermined image, and a driving signal may be sequentially applied to the common electrode patterns during a second frame period in which the LCD performs an operation of recognizing a touch.

A scan or sustain signal may be applied to the respective gate or storage lines during a first frame period in which the LCD performs an operation of displaying a predetermined image, and a driving signal may be sequentially applied to the gate or storage lines during a second frame period in which the LCD performs an operation of recognizing a touch.

As described above, according to embodiments, when a mutual capacitive touch screen panel is integrally implemented in an LCD, conductive patterns or conducting patterns provided to the LCD may be used as driving electrodes of the touch screen panel, and the driving electrode of the touch screen panel may be formed on one surface of a polarizing plate or window attached to the LCD so as to be positioned close to a contact point, thereby improving touch sensitivity.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A liquid crystal display (LCD) with an integrated touch screen panel, the LCD comprising:
    a first substrate having a plurality of pixels formed thereon, wherein each of the plurality of pixels comprises a thin film transistor and a pixel electrode, the pixel electrode being connected to a drain electrode of the thin film transistor through a contact hole formed in a protective layer;
    a second substrate positioned to face the first substrate, the second substrate having a plurality of common electrode patterns formed thereon, wherein the plurality of common electrode patterns are arranged in a first direction to respectively correspond to the pixel electrodes;
    first and second polarizing plates respectively attached to outer surfaces of the first and second substrates;
    a window attached to an outer surface of the second polarizing plate;
    sensing electrodes formed on one surface of one of the second polarizing plate and window, wherein the sensing electrodes are and configured as a plurality of patterns arranged in a second direction, and wherein the second direction intersects the first direction, and wherein the second polarizing layer is positioned at least partially between the sensing electrodes and the second substrate; and
    a liquid crystal layer formed between the first and second substrate.

2. The LCD according to claim 1, further comprising a back light positioned on a bottom surface of the first substrate to provide light.

3. The LCD according to claim 1, wherein the sensing electrodes are formed by attaching a film in which a transparent conductive material is patterned to the second polarizing plate or window.

4. The LCD according to claim 1, wherein the same voltage is applied to the common electrode patterns during a first frame period in which the LCD performs an operation of displaying a predetermined image, and a driving signal is sequentially applied to common electrode patterns during a second frame period in which the LCD performs an operation of recognizing a touch.

5. The LCD according to claim 4, wherein the first and second frame periods are sequentially and repeatedly operated.

6. An LCD with an integrated touch screen panel, the LCD comprising:
    a first substrate having a plurality of pixels formed thereon, wherein the plurality of pixels are positioned between gate and storage lines arranged in a first direction and data lines arranged in a second direction, respectively, and each of the plurality of pixels comprises a thin film transistor and a pixel electrode, the pixel electrode being connected to a drain electrode of the thin film transistor through a contact hole formed in a protective layer;
    a second substrate positioned to face the first substrate, the second substrate having color filter patterns arranged corresponding to the respective pixels and a common electrode formed on the color filter patterns;
    first and second polarizing plates respectively attached to outer surfaces of the first and second substrates;
    a window attached to an outer surface of the first polarizing plate;
    sensing electrodes formed on one surface of one of the first polarizing plate or window, wherein the sensing electrodes are configured as a plurality of patterns arranged in the second direction, and wherein the first polarizing plate is positioned at least partially between the sensing electrodes and the first substrate; and
    a liquid crystal layer formed between the first and second substrates,
    wherein the gate or storage lines are used as driving electrodes which respectively correspond to the sensing electrodes.

7. The LCD according to claim 6, further comprising a back light positioned on a top surface of the second substrate to provide light.

8. The LCD according to claim 6, wherein the sensing electrodes are formed by attaching a film, and wherein the film includes a transparent conductive material patterned to the first polarizing plate or window.

9. The LCD according to claim 6, wherein a scan or sustain signal is applied to the respective gate or storage lines during a first frame period in which the LCD performs an operation of displaying a predetermined image, and a driving signal is sequentially applied to the gate or storage lines during a second frame period in which the LCD performs an operation of recognizing a touch.

10. The LCD according to claim 9, wherein the first and second frame periods are sequentially and repeatedly operated.

* * * * *